(12) United States Patent
Wu et al.

(10) Patent No.: US 12,045,251 B2
(45) Date of Patent: Jul. 23, 2024

(54) METHOD AND SYSTEM FOR AUTOMATICALLY GENERATING DATA ACQUISITION MODULE

(71) Applicant: GUANGZHOU QUICK DECISION IINFORMATION TECHNOLOGY CO., LTD., Guangzhou (CN)

(72) Inventors: Lianwang Wu, Guangzhou (CN); Shaohui Li, Guangzhou (CN); Huafeng Chen, Guangzhou (CN); Pingfeng Liu, Guangzhou (CN)

(73) Assignee: GUANGZHOU QUICK DECISION IINFORMATION TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 17/605,992

(22) PCT Filed: Mar. 5, 2021

(86) PCT No.: PCT/CN2021/079185
§ 371 (c)(1),
(2) Date: Oct. 22, 2021

(87) PCT Pub. No.: WO2021/175303
PCT Pub. Date: Sep. 10, 2021

(65) Prior Publication Data
US 2022/0198489 A1 Jun. 23, 2022

(30) Foreign Application Priority Data
Mar. 5, 2020 (CN) .......................... 202010145569.2

(51) Int. Cl.
*G06F 16/25* (2019.01)
(52) U.S. Cl.
CPC .................. *G06F 16/258* (2019.01)

(58) Field of Classification Search
CPC .............. G06F 16/258; G06Q 30/0203; G06Q 30/0217
See application file for complete search history.

(56) References Cited

U.S. PATENT DOCUMENTS 5,936,225 A * 8/1999 Arning ..................... G09B 5/00 235/456
9,672,753 B2 6/2017 Rogers et al.
(Continued)

FOREIGN PATENT DOCUMENTS

| CN | 102193906 A | 9/2011 |
| CN | 102929612 A | 2/2013 |

(Continued)

OTHER PUBLICATIONS

Kroehne et al., How to conceptualize, represent, and analyze log data from technology-based assessments? A generic framework and an application to questionnaire items, Behaviormetrika (2018) 45:527-563. (Year: 2018).*

(Continued)

*Primary Examiner* — Cheyne D Ly
(74) *Attorney, Agent, or Firm* — CANTOR COLBURN LLP

(57) ABSTRACT

A method and a system for automatically generating a data acquisition module are provided. The method is such that an input terminal inputs at least one piece of data to be converted, and sends the at least one piece of data to be converted to a conversion terminal. Each of the at least one piece of data to be converted includes at least one piece of identification information. The conversion terminal identifies the at least one piece of identification information to obtain an identification result. The at least one piece of data (Continued)

to be converted is converted into target data. A data generation end at least generates a data acquisition module based on the target data.

8 Claims, 3 Drawing Sheets

(56) References Cited

U.S. PATENT DOCUMENTS

| | | | |
|---|---|---|---|
| 10,306,002 B2 | 5/2019 | Chiu | |
| 2002/0052877 A1* | 5/2002 | Okamoto | G06Q 10/08 |
| 2002/0156673 A1* | 10/2002 | Barker | G06Q 30/0203 |
| | | | 705/1.1 |
| 2012/0226743 A1* | 9/2012 | Smargon | G06Q 20/06 |
| | | | 709/203 |
| 2015/0261882 A1* | 9/2015 | Roberts | G06F 16/86 |
| | | | 707/756 |
| 2017/0249646 A1 | 8/2017 | Krupa et al. | |
| 2018/0260460 A1* | 9/2018 | Alba | G06F 16/24522 |
| 2018/0293223 A1 | 10/2018 | Ackermann et al. | |

FOREIGN PATENT DOCUMENTS

| | | |
|---|---|---|
| CN | 103778172 A | 5/2014 |
| CN | 103810150 A | 5/2014 |
| CN | 103853852 A | 6/2014 |
| CN | 104123399 A | 10/2014 |
| CN | 105488015 A | 4/2016 |
| CN | 105488171 A | 4/2016 |
| CN | 106599077 A | 4/2017 |
| CN | 107122344 A | 9/2017 |
| CN | 107463537 A | 12/2017 |
| CN | 107766301 A | 3/2018 |
| CN | 110599839 A | 12/2019 |
| CN | 111369290 A | 7/2020 |
| TW | I522960 B | 2/2016 |
| WO | WO-0244829 A2 * | 6/2002 ............ G06Q 30/02 |
| WO | 2019215558 A1 | 11/2019 |

OTHER PUBLICATIONS

Yamanishi et al., Mining Open Answers in Questionnaire Data, IEEE Intelligent Systems, Sep./Oct. 2002, pp. 58-63. (Year: 2002).*
Gottipati et al., Text analytics approach to extract course improvement suggestions from students' feedback, Research and Practice in Technology Enhanced Learning (2018) 13:6, pp. 1-19. (Year: 2018).*
Chinese Search Report Application No. PCT/CN2021/079185; Issued May 28, 2021; pp. 5.
Search Report issued in European Patent Application No. 21763596. 0; Application Filing Date Mar. 5, 2021; Date of Mailing Dec. 9, 2022 (6 pages).
Search Report issued in Taiwanese Patent Application No. 110107988; Application Filing Date Mar. 5, 2021; Date of Mailing Oct. 12, 2021 (15 pages).

* cited by examiner

METHOD AND SYSTEM FOR AUTOMATICALLY GENERATING DATA ACQUISITION MODULE

CROSS-REFERENCE TO RELATED APPLICATIONS

This application is a National Phase Application which claims priority to PCT Application No. PCT/CN2021/079185 filed Mar. 5, 2021 which claims priority to Chinese Application No. CN202010145569.2 filed Mar. 5, 2020 entitled "METHOD AND SYSTEM FOR AUTOMATICALLY GENERATING DATA ACQUISITION MODULE", which is incorporated herein by reference in its entirety.

TECHNICAL FIELD

The application relates to the technical field of data conversion, and particularly to a method and system for automatically generating data acquisition module.

BACKGROUND

In recent years, questionnaires have been widely used in people's daily life, which is mainly reflected in many questionnaire websites on the Internet. Questionnaire is an important means for investigating and counting certain information At present, in mainstream questionnaire generation methods, information, such as question content, question option, question type, etc., of each questionnaire question is mainly input in a questionnaire system. When many questionnaire questions are entered by the method, it usually takes a lot of time cost and labor cost, the efficiency of entering the questionnaire questions is low, and the user experience is poor.

SUMMARY

One aspect of embodiments of the specification provides a method for automatically generating a data acquisition module. The method includes that: an input terminal inputs at least one piece of data to be converted, and sends the at least one piece of data to be converted to a conversion terminal, herein each of the at least one piece of data to be converted includes at least one piece of identification information; the conversion terminal identifies the at least one piece of identification information according to the received data to be converted to obtain an identification result; the at least one piece of data to be converted is converted into target data according to the identification result; and a data generation end at least generates a data acquisition module based on the target data.

Another aspect of the embodiments of the specification provides a system for automatically generating a data acquisition module. The system includes an input terminal, a conversion terminal, and a data generation end. The input terminal is configured to input at least one piece of data to be converted, and send the at least one piece of data to be converted to a conversion terminal, herein each of the at least one piece of data to be converted includes at least one piece of identification information. The conversion terminal is configured to identify the at least one piece of identification information according to the received data to be converted to obtain an identification result, and convert the at least one piece of data to be converted into target data according to the identification result. The data generation end is configured to generate a data acquisition module at least based on the target data.

Another aspect of the embodiments of the specification provides an apparatus for automatically generating a data acquisition module. The apparatus includes a processor. The processor is configured to execute the method for automatically generating a data acquisition module.

Another aspect of the embodiments of the specification provides a computer readable storage medium. The storage medium stores computer instructions. A computer executes a method for automatically generating a data acquisition module after reading the computer instructions in the storage medium.

BRIEF DESCRIPTION OF THE DRAWINGS

The application will be further described with exemplary embodiments. These exemplary embodiments will be described in detail through accompanying drawings. These embodiments are unrestrictive. In these embodiments, the same numbers represent the same structures.

DETAILED DESCRIPTION OF THE EMBODIMENTS

Figure 1:
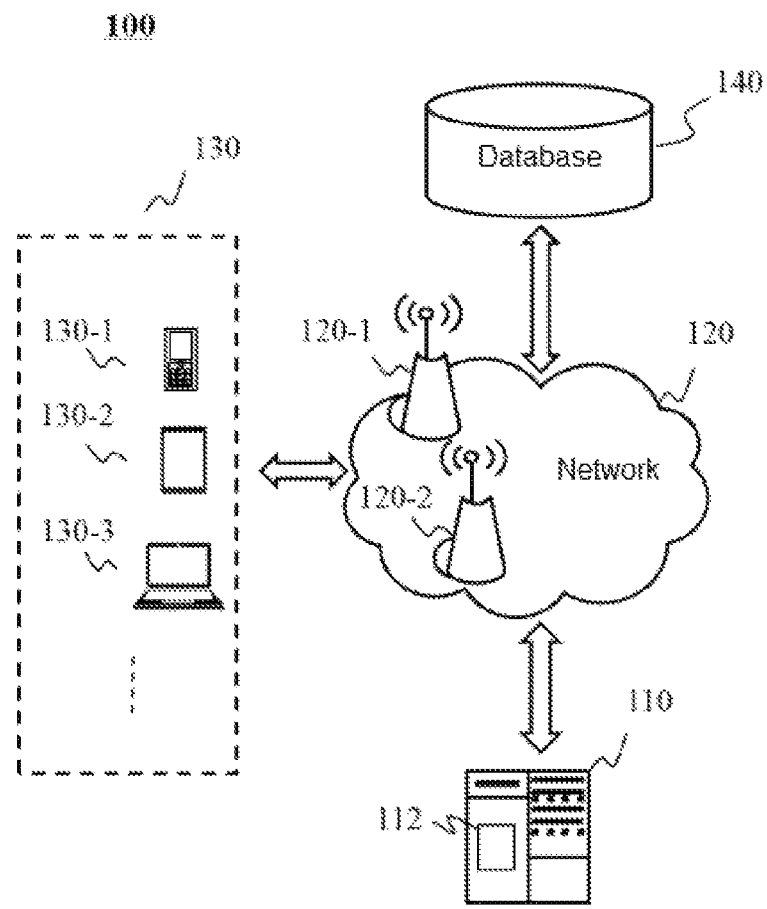
FIG. 1 is a schematic diagram of an application scenario of a system for automatically generating a data acquisition module according to some embodiments of the application.

To describe technical solutions in embodiments of the application more clearly, the following briefly describes the accompanying drawings required for describing the embodiments. It is apparent that the accompanying drawings in the following description are only some examples or embodiments of the application. Those skilled in the art can also apply the application to other similar situations according to the these accompanying drawings without any creative work. Unless apparent from the language environment or otherwise stated, the same reference signs in the drawings represent the same structures or operations.

It should be understood that "system", "apparatus", "unit", and/or "module" used herein are/is methods/a method used to distinguish different components, elements, parts, portions, or assemblies of different levels. However, if other terms may achieve the same purpose, these terms may be replaced with other expressions.

As shown in the application and the claims, terms such as "a/an", "one", "a kind of", and "the" do not refer in particular to a singular form but may also include a plural form, unless exceptional cases are clearly indicated in the context. In general, terms "include" and "contain" only indicate inclusion of steps and elements that are clearly identified, these steps and elements do not form an exclusive enumeration, and a method or device may also include other steps or elements.

In the application, the flowchart is used to describe operations executed by a system according to the embodiments of the application. It should be understood that previous or subsequent operations are not always executed accurately in sequence. Instead, each step may be processed in an inverted sequence or at the same time. In addition, other operations may also be added to these processes, or one or more operations may be removed from these processes.

FIG. 1 is a schematic diagram of an application scenario of a system for automatically generating a data acquisition module according to some embodiments of the application.

An automatic data acquisition module generation system 100 may convert a plurality of questions into questions in a corresponding questionnaire survey format at the same time. For example, the automatic data acquisition module generation system 100 may be used in the field of questionnaires, specifically, may identify a plurality of pieces of input data to be converted to identify identification information therein, determine an identification result, that is, a question type, question content, and content corresponding to question options of each question, and convert the plurality of pieces of data to be converted into a question type, question content, and question options corresponding to a questionnaire format. The converted data may be directly entered into the question content in a questionnaire to improve the efficiency of entering questionnaire questions.

The automatic data acquisition module generation system 100 may be an online service platform for Internet services. For example, the automatic data acquisition module generation system 100 may be used in an online questionnaire survey platform. The automatic data acquisition module generation system 100 may include a server 110, a network 120, an input terminal 130, and a database 140. The server 110 may include a processing device 112.

In some embodiments, the server 110 may be configured to process information and/or data related to automatically generating a data acquisition module. For example, the server 110 may convert the data that is input by the input terminal and needs to be converted (for example, question data input by a user through the input terminal). The server 110 may be an independent server or a server group. The server group may be integrated or distributed (for example, the server 110 may be a distributed system). In some embodiments, the server 110 may be regional or remote. For example, the server 110 may access the information and/or data stored in the input terminal 130 or the database 140 through the network. In some embodiments, the server 110 may be directly connected to the input terminal 130 and the database 140 to access the information and/or data stored therein. In some embodiments, the server 110 may be executed on a cloud platform. For example, the cloud platform may include one or any combination of private cloud, public cloud, mixed cloud, community cloud, distributed cloud, internal cloud, etc.

In some embodiments, the server 110 may include a processing device 112. The processing device 112 may process data and/or information related to generating a data acquisition module to execute one or more functions described in the application. For example, the processing device 112 may identify the type of the data to be converted input by the input terminal 130 (for example, determine that a question of the input question data belongs to a single-choice question, a multiple-choice question, etc.). In some embodiments, the processing device 112 may include one or more sub-processing devices (for example, a single-core processing device or a multi-kernel and multi-core processing device). As an example merely, the processing device 112 may include a Central Processing Unit (CPU), an Application Specific Integrated Circuit (ASIC), an Application Specific Instruction Set Processor (ASIP), a Graphics Processor (GPU), a Physical Processor (PPU), a Digital Signal Processor (DSP), a Field Programmable Gate Array (FPGA), a Programmable Logical Circuit (PLD), a controller, a microcontroller unit, a Reduced Instruction Set Computer (RISC), a microprocessor, etc. or any combination of the above.

The network 120 may facilitate exchange of data and/or information, and the data and/or information may include a plurality of pieces of data to be converted, for example, data of a plurality of questions that are sent to the server 110 by the input terminal 130 and need to be identified. In some embodiments, one or more components (for example, the server 110, the input terminal 130, and the database 140) in the automatic data acquisition module generation system 100 may send data and/or information to other components in the automatic data acquisition module generation system 100 through the network 120. In some embodiments, the network 120 may be any type of wired or wireless network. For example, the network 120 may include a cable network, a wired network, an optical fiber network, a telecommunication network, an internal network, the Internet, a Local Area Network (LAN), a Wide Area Network (WAN), a Wireless LAN (WLAN), a Metropolitan Area Network (MAN), a Public Switched Telephone Network (PSTN), a Bluetooth network, a ZigBee network, a Near Field Communication (NFC) network, or any combination of the above. In some embodiments, the network 120 may include one or more network access points. For example, the network 120 may include wired or wireless network access points, for example, base station and/or Internet switch points 120-1, 120-2, . . . . Through these access points, one or more components of the automatic data acquisition module generation system 100 may be connected to the network 120 to exchange data and/or information.

The input terminal 130 may be a terminal of a device with a data input function, which may include one or any combination of a mobile phone 130-1, a tablet computer 130-2, a notebook computer 130-3, etc. In some embodiments, the input terminal 130 may include an apparatus with a data sending function, which sends the data to the server 110 when the plurality of pieces of input data to be converted are acquired. In some embodiments, the input terminal 130 may send the data to the server 110 through the network 120. For example, the input terminal 130 may send a plurality of pieces of question data to be converted to the server 110 through the network 120.

The database 140 is configured to provide an information source for the system 100. The database 140 may be configured to provide service related information for the system 100, for example, a variety of questions in different fields, questions of different question types, questions with different question contents, etc. For another example, the database 140 may also include all questions for a specific field, etc. The specific field may be the fields of medical treatment, media, and science and technology. The database 140 may be implemented in a single central server, and a plurality of servers or a plurality of personal devices connected through communication links. The database 140 may be generated by a plurality of personal devices and a cloud server. In some embodiments, the database 140 may store converted target data. For example, a series of questions converted into questionnaire question formats. In some embodiments, the database 140 may store a data acquisition module generated on the basis of the target data. For example, a generated questionnaire. In some embodiments, the database 140 may store information and/or instructions executed or used by the server 110 to execute exemplary methods described in the application. In some embodiments, the database 140 may include a high-capacity memory, a removable memory, a volatile read-write memory (for example, a Random Access Memory (RAM)), a Read-Only Memory (ROM), or any combination of above. In some embodiments, the database 140 may be implemented on a cloud platform. For example, the cloud platform may include private cloud, public cloud, mixed cloud, community cloud, distributed cloud, internal cloud, etc., or any combination of above.

In some embodiments, the database 140 may be connected with the network 120 to communicate with one or more components (for example, the server 110, the input terminal 130, etc.) of the system 100. One or more components of the automatic data acquisition module generation system 100 may access the data or instructions stored in the database 140 through the network 120, for example, a series of question information for a certain shampoo, a series of question information for audience satisfaction of a certain variety show, or the like. In some embodiments, the database 140 may be directly connected or communicate with one or more components (for example, the server 110, the input terminal 130, etc.) in the automatic data acquisition module generation system 100. In some embodiments, the database 140 may be a part of the server 110.

Figure 2:
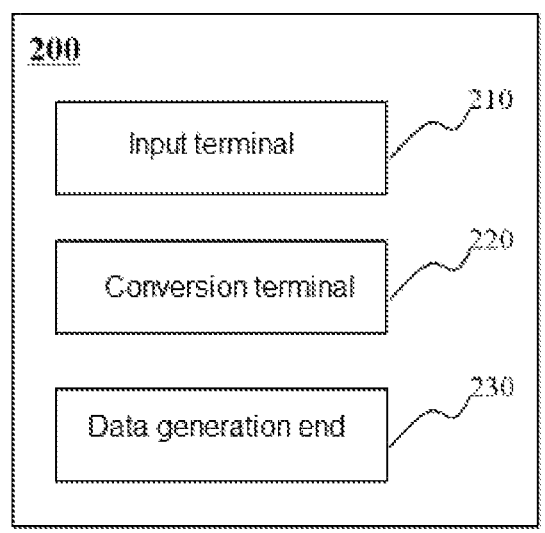
FIG. 2 is a module diagram of a system for automatically generating a data acquisition module according to some embodiments of the application.

FIG. 2 is a module diagram of a system for automatically generating a data acquisition module according to some embodiments of the application.

As shown in FIG. 2, the system for automatically generating a data acquisition module may include an input terminal 210, a conversion terminal 220, and a data generation end 230.

The input terminal 210 may be configured to input at least one piece of data to be converted, and send the at least one piece of data to be converted to the conversion terminal. Each of the at least one piece of data to be converted includes at least one piece of identification information.

The conversion terminal 220 may be configured to identify the at least one piece of identification information according to the received data to be converted to obtain an identification result, and convert the at least one piece of data to be converted into target data according to the identification result.

The data generation end 230 may be configured to generate a data acquisition module at least based on the target data.

In some embodiments, the conversion terminal is further configured to determine a conversion type of the at least one piece of data to be converted according to the identification result, extract a corresponding conversion strategy based on the conversion type, and convert the at least one piece of data to be converted into target data based on the corresponding conversion strategy and the identification result.

In some embodiments, the conversion terminal 220 is further configured to determine a switching manner according to the identification result, and switch the at least one piece of data to be converted based on the switching manner.

In some embodiments, the input data to be converted and the converted target data are displayed on an interface of the input terminal 210 at the same time.

In some embodiments, the input terminal 210 generates a modification instruction according to the target data displayed on the interface. The conversion terminal 220 locates first data to be converted corresponding to first target data that does not meet a preset requirement according to the modification instruction. The input terminal 210 modifies the first data to be converted according to the modification instruction.

In some embodiments, the at least one piece of identification information includes a switching identifier and/or a type identifier.

It should be understood that the system and modules thereof shown FIG. 2 may be implemented in various manners. For example, in some embodiments, the system and the modules thereof may be implemented by hardware, software, or a combination of software and hardware. The hardware part may be implemented by a special logic. The software part may be stored in a memory and executed by a proper instruction execution system such as a microprocessor or dedicated design hardware. Those skilled in the art can understand that the previously described method and system may be implemented by using a computer-executable instruction and/or including in a processor control code. Such a code is provided in, for example, a carrier medium like a magnetic disk, a Compact Disc (CD), or a Digital Video Disk-Read Only Memory (DVD-ROM), a programmable memory like a read-only memory (firmware), or a data carrier like an optical or electronic signal carrier. The system and modules thereof in the application may be implemented by a hardware circuit, for example, a very-large-scale integrated circuit or gate array, a semiconductor like a logic chip, a transistor, etc., or a programmable hardware device like a field-programmable gate array, a programmable logic device, etc., or may be implemented by, for example, various types of software executed by a processor, or may be implemented by a combination (for example, firmware) of the hardware circuit and the software.

It is to be noted that the above description about a candidate option display and determination system and modules thereof is only for ease of description and may not limit the application to the scope of the listed embodiments. It can be understood that those skilled in the art, after understanding the principle of the system, may freely combine each module or form subsystems for connection with the other modules without departing from the principle. For example, in some embodiments, for example, the input terminal 210, the conversion terminal 220, and the data generation end 230 disclosed in FIG. 2 may be different modules in one system, or may be one module that realizes functions of two or more modules above. For example, the input terminal 210 and the conversion terminal 220 may be two modules, or may be one module that has the functions of inputting and converting at the same time.

Figure 3:
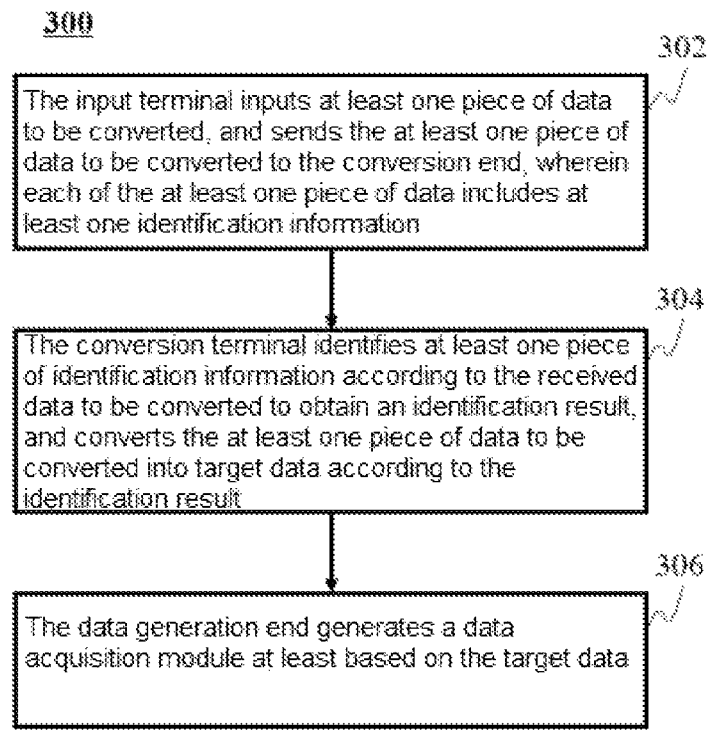
FIG. 3 is an exemplary flowchart of a first implementation manner of a method for automatically generating a data acquisition module according to some embodiments of the application.

FIG. 3 is an exemplary diagram of a method for automatically generating a data acquisition module according to some embodiments of the application.

At Step 302, the input terminal inputs at least one piece of data to be converted, and sends the at least one piece of data to be converted to the conversion terminal. Each of the at least one piece of data to be converted includes at least one piece of identification information. Specifically, Step 302 may be executed by the input terminal 210.

The input terminal may be any terminal with a data input function, for example, a mobile phone and a computer.

The data to be converted may be input text information and character information that need to be converted, for example, input texts, numbers, letters, symbols, or punctuations. In some embodiments, the data to be converted may be questionnaire question content input by a user through the input terminal. The content may include question content and question options. For example, the content input by the user may be one choice question, or a plurality of choice questions. The plurality of choice questions may include choice questions, blank-filling questions, ranking questions, and question content and question options included in each question.

The conversion terminal may be any terminal with a data conversion function, for example, a mobile phone and a computer. Some of these terminals may have a program with a data conversion function.

Identification information may represent certain information of the data to be converted. In some embodiments, the identification information may consist of one or more types of characters. The character includes but is not limited to any character, such as numbers, letters, punctuations, texts, and other characters. For example, the identification information may be represented by one or more newline characters.

In some embodiments, the identification information may include but is not limited to a switching identifier and a type identifier. The switching identifier may be an identifier configured to realize the switching of different contents. In some embodiments, the switching identifier may include but is not limited to switching between questions, switching between a question and an option, switching between options, switching between a text and a picture, etc. In some embodiments, the switching identifier may be represented by a character. In some embodiments, 'enter' character on a keyboard, a first 'enter' character represents the switching between the question and the option, the second or more 'enter' characters are equivalent to the switching between the options, and two or more continuous 'enter' characters are equivalent to the switching between the questions.

The type identifier may be an identifier configured to realize the identifying of a type to which the content belongs. In some embodiments, question types that can be identified include but are not limited to single-choice questions, multiple-choice questions, blank-filling questions, ranking questions, PK questions, scoring questions, and matrix questions. In some embodiments, the type identifier may be represented by a character. For example, '[ ]' or '[ ]' characters on the keyboard, the text included in the '[ ]' or '[ ]' is the question type of each question, for example, "[single-choice question]", "[multiple-choice question]", or "[ranking question]", then it means that the question is a single-choice question, or a multiple-choice question, or a ranking question.

In some embodiments, the input terminal inputs at least one piece of data to be converted, and sends the at least one piece of data to be converted to the conversion terminal. Each of the at least one piece of data to be converted includes at least one piece of identification information. In some embodiments, the input terminal may input the data to be converted through input apparatuses, such as a keyboard and a handwriting screen. Or, data to be converted is pasted to corresponding location through the input terminal by copying and pasting the data to be converted in other documents. In some embodiments, numerous questionnaire survey questions in a certain document may be copied and pasted to the input terminal together. The numerous questionnaire survey questions in the input terminal are subjected to adaptive modification (may be adding a switching identifier and a type identifier), so that the conversion terminal may identify the question type, the question content, and the question options of each question from the numerous questionnaire survey questions, and simultaneously covert the numerous questionnaire survey questions exported in batches.

For example, "How old are you? (newline) 18-24 years old (newline) 24-38 years old[single-choice question]" is input from a computer. There is a switching identifier between a question and options in the input content (corresponding to a first 'enter' on a keyboard, that is, a first online character), a switching identifier between options (a second or later 'enter', that is a second and later newline character), and a type identifier of a question ('[ ]') in the input content. For another example, "How old are you? (newline) 18-24 years old (newline) 24-38 years old[single-choice question] (two continuous newlines) What's your occupation, please_?[Blank-filling question]" is input from a computer. Identifiers include a switching identifier between a question and options (a first newline character 'enter'), a switching identifier between options (a second or later newline characters 'enter'), two or more continuous switching identifiers ('enter enter'), and a type identifier ("[single-choice question]" and "[blank-filling question]").

At Step 304, the conversion terminal identifies the at least one piece of identification information according to the received data to be converted to obtain an identification result, and converts the at least one piece of data to be converted into target data according to the identification result. Specifically, Step 304 may be executed by the conversion terminal 220.

The identification result may be a result that the conversion terminal identifies at least one piece of identification information of the input data to be converted. For example, the conversion terminal identifies a switching identifier and a type identifier in the input data to obtain corresponding parts of the question type, the question content, and the question options of the input data as an identification result.

The target data may be final data converted from the data to be converted. In some embodiments, the target data may be the questions meeting requirements converted according to the question content input by a user from the input terminal, for example, the question in a questionnaire. The converted question needs to meet the format requirements of the questionnaire. The content that is input by the input terminal and needs to be converted into a questionnaire survey format is identified first, and the input data to be converted is converted into the same question type, question content, and question options as the questionnaire survey format as final data according to the parts corresponding to obtained question type, question content, and question options.

In some embodiments, the conversion terminal identifies at least one piece of identification information according to received data to be converted to obtain an identification result. In some embodiments, the '[ ]' or '{ }' (type identifier) in the data to be converted may be obtained first through identifying, and the text inside are identified (the question type to which the data to be converted belongs). In some embodiments, the text of a type may be identified through a language identification model to determine the type of a question. In some embodiments, an identification result may be obtained by identifying the location and the number of 'enter' (which 'enter'). In some embodiments, a switching manner is determined according to a switching identifier identified in the identification result, and at least one piece of data to be converted is switched based on the switching manner. For example, when two or more newline characters (the newline characters may be 'enter') are identified, then the data to be converted is switched. Two newline characters may be set between every two pieces of data to be converted, so that a plurality of pieces of data to be converted (each question) may be switched and distinguished.

In some embodiments, the conversion terminal may convert the at least one piece of data to be converted into target data based on the identification result. For example, the input data is "How old are you (newline) 18-24 years old (newline) 25-38 years old[single-choice question]", data conversion software may identify the switching identifier (a first enter newline character is the switching between a question and options, subsequent enter and newline character are the switching between options) included in the data and a type identifier ([single-choice question]) to obtain that the question type is a single-choice question, the question content is "How old are you", and the question options are "18-24 years old" and "25-38 years old" as an identification result. The piece of data is converted into the question type of a single-choice question, the question content of "How old are you", and question options of "A. 18-24 years old B. 25-38 years old" as target data according to the identification result. The converted question may be used as a questionnaire question of questionnaire survey or questionnaire statistics. A client may achieve the effects of survey and statistics of the questionnaire by answering in the questionnaire according to the questionnaire question.

In some embodiments, the input data to be converted and the converted target data are displayed on an interface of an input terminal at the same time. For example, a plurality of input questions and a plurality of converted question contents are displayed on a display interface of a computer terminal, so that a user may observe whether the input questions and the converted question contents are consistent, whether the converted questions meet requirements, or the like, and determine whether to modify the input data to be converted according to an observation result.

A modification instruction may be an instruction representing that the target data needs to be reconverted, and may also be an instruction representing that the data to be converted needs to be modified. The first data to be converted may refer to conversion data that needs to be modified, or the data to be converted corresponding to the target data that does not meet a preset requirement.

In some embodiments, the input terminal may generate a modification instruction according to target data displayed on the interface. Specifically, if the converted target data does not meet a preset requirement (that is, the first data to be converted), a user may generate a modification instruction through the input terminal. The preset requirement may be respective parts of the question type, question content and question options preset according to the setting of identification information.

In some embodiments, the modification instruction may be generated by double clicking the target data that does not meet a requirement on the interface of the input terminal. In some embodiments, the modification instruction may be generated by inputting a question number in the input terminal. The modification instruction may also be generated in other manners, which is not limited in the embodiment.

In some embodiments, the conversion terminal may locate the first data to be converted corresponding to the first target data that does not meet the preset requirement according to the modification instruction. For example, after receiving the modification instruction sent by the input terminal, the conversion terminal may locate the location of a mouse to the corresponding first data to be converted, so as to facilitate the modification of the input terminal.

In some embodiments, the input terminal modifies the first data to be converted according to the modification instruction. For example, the data to be converted displayed by a display interface of a computer terminal is "How old are you 18-24 years old (newline) 25-38 years old[single-choice question]", the question content of the displayed target data is "How old are you 18-24 years old", and the question option is "25-38 years old". A user may find that "18-24 years old" in question option A originally appears in question content after conversion from the displayed content, resulting in errors in the converted question content and question options.

A user may generate a modification instruction through the input terminal. For example, a switching identifier (may be 'enter') is added between "How old are you" and "18-24 years old". The conversion terminal modifies the data to be converted according to the modification instruction to generate correct target data, that is, the question content is "How old are you", and the question options are "18-24 years old" and "25-38 years old".

At Step 306, a data generation end generates a data acquisition module at least based on target data. Specifically, Step 306 may be executed by the data generation end 230.

The data generation end may be a terminal used for generating a certain data type, for example, generating software or other computer applications in a questionnaire form.

The data acquisition module may be a module that carries a certain type of data content, for example, the module that carries the questionnaire form and questionnaire content.

In some embodiments, the data generation end generates the data acquisition module at least based on the target data. For example, the content in the questionnaire form is generated based on content information included in the target data. A data format in the generated questionnaire form content may be consistent with the data format of a questionnaire website in the Internet. The generated data acquisition module that carries the questionnaire form content may be applied to any questionnaire website with the same format in the Internet.

Figure 4:
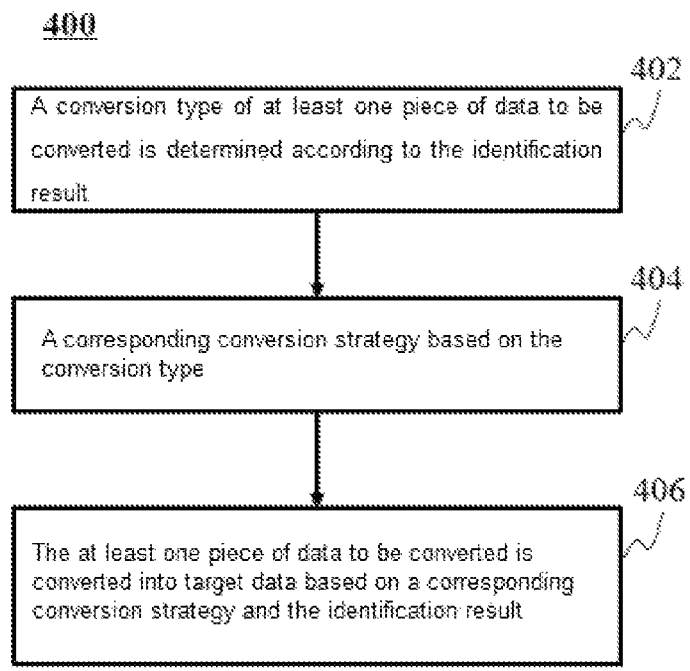
FIG. 4 is an exemplary flowchart of sub-steps of Step 304 according to some embodiments of the application.

FIG. 4 is an exemplary flowchart of sub-steps of Step 304 according to some embodiments of the application.

At Step 402, a conversion type of at least one piece of data to be converted is determined according to the identification result. Specifically, Step 402 may be executed by the conversion terminal 220.

The conversion type may be a target type to which each piece of data to be converted needs to be converted. For example, a plurality of pieces of data to be converted are a plurality of questions and content therein, the target type may be a single-choice question, a multiple-choice question, a scoring question, a blank-filling question, etc.

In some embodiments, the conversion type of the at least one piece of data to be converted is determined according to the identification result. The conversion type that may be determined is a single-choice question, a multiple-choice question, a blank-filling question, a ranking question, a PK question, a scoring question, or a matrix question. For example, the question type of the question in the identification result is a single-choice question, or a multiple-choice question, or a blank-filling question, or a ranking question, or a PK question, or a scoring question, or a matrix question, and it is determined that each question type of one or more questions is one of the plurality of types described previously.

In some embodiments, when the question type of a piece of data to be converted (a question) is not identified by the identification result, then it is determined that the conversion type of the data to be converted is a preset type, such as a single-choice question or a blank-filling question. For example, the input data to be converted is "Your satisfaction with the product is_, and it needs to be improved in the aspect of_." The input data does not have the question type identifier '[ ]' or '{ }', the conversion terminal cannot identify the type identifier from the data to be converted, and the data to be converted is automatically identified as the question type of a single-choice question or a blank-filling question. The first lines of the single-choice question and the blank-filling question are both question content. When there is second row (for example, the single-choice question), the content of a second row is a question option. When there is not second row (for example, the blank-filling question), only the question content of the question is identified.

At Step 404, a corresponding conversion strategy is extracted based on the conversion type. Specifically, Step 404 may be executed by the conversion terminal 220.

The conversion strategy may be that each type of questions have corresponding conversion rules. For example, single-choice question, multiple-choice question, and blank-filling question types have corresponding conversion rules, a scoring question type has a conversion rule corresponding to the scoring question type, and a matrix question type has a conversion rule corresponding to the matrix question type.

In some embodiments, the corresponding conversion strategy is extracted based on the conversion type. For example, when the question type in the identification result is a single-choice question, then a conversion rule corresponding to the single-choice question is extracted. If the question type is a scoring question, then a conversion rule corresponding to the scoring question is extracted.

In some embodiments, the conversion rules of the single-choice question, the multiple-choice question may be that the first row (in front of the first 'enter') is the question content, and the second and later lines (in front of each 'enter' behind the first 'enter') is the option content of each question. For another example, the conversion rule of the scoring question may be that the first row is a scoring option, and the first row of the data to be converted needs to be matched with one of '1-10', '1-10 scores', '1~10', and '1~10 scores'. For another example, the conversion rule of the matrix question may be that the first row is a matrix question, each question may use split and identified by using one or more space characters, and the second row and later subsequent lines are matrix options.

At Step 406, the at least one piece of data to be converted is converted into the target data based on the corresponding conversion strategy and the identification result. Specifically, Step 406 may be executed by the conversion terminal 220.

In some embodiments, the at least one piece of data to be converted is converted into the target data based on the conversion strategy corresponding to the at least one data to be converted and the identification result. For example, the input data to be converted is "How old are you (newline) 18-24 years old (newline) 25-38 years old [single-choice question]", and the identified data to be converted is a single-choice question type, then the conversion strategy for extracting the single-choice question is that the first line (in front of the first 'enter') is the question content, and the second line and later lines (in front of each 'enter' behind the first 'enter') is the option content of the question. The input conversion data is converted into the question type of "single-choice question", the question content of "How old are you", and question options of "18-24 years old" and "25-38 years old" as target data based on the conversion strategy and the identification result.

In some embodiments, the application provides an apparatus for automatically generating a data acquisition module. The apparatus includes a processor. The processor is configured to execute the previously described method for automatically generating a data acquisition module.

Figure 5:
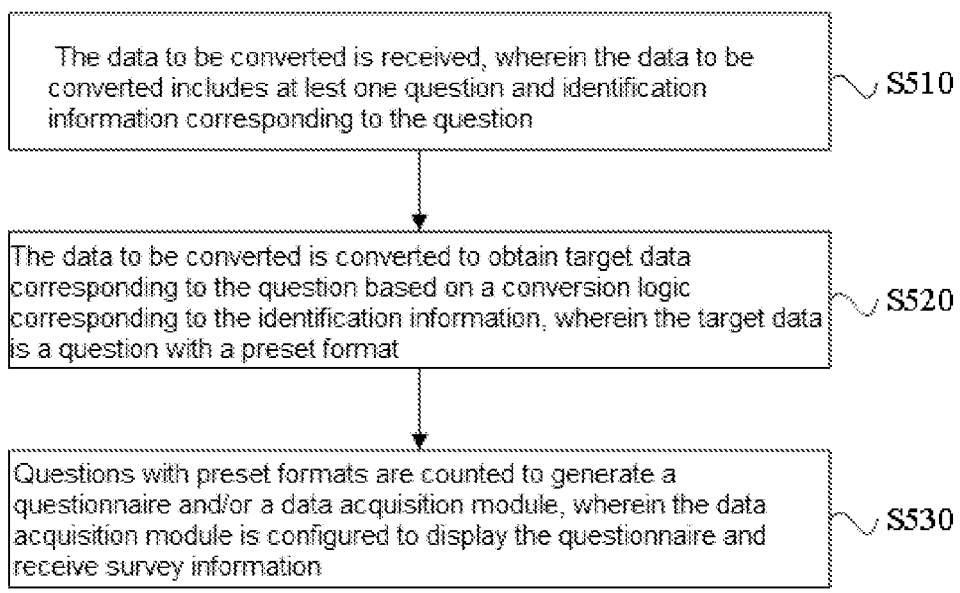
FIG. 5 is an exemplary flowchart of a second implementation manner of a method for automatically generating a data acquisition module according to some embodiments of the application.

Embodiments of the specification further provide a method for automatically generating a data acquisition module. The above method may be applied to any single front-end apparatus or rear-end apparatus, as shown in FIG. 5, including the following operations.

At 510, data to be converted is received. The data to be converted includes at least one question and identification information corresponding to the question. Step 510 may be completed based on a module with the functions of converting and inputting, such as a sound pickup, a keyboard, and a touch screen.

At 520, the data to be converted is converted based on a conversion logic corresponding to the identification information to obtain target data corresponding to the question. The target data is a question with a preset format. Step 520 may be completed based on a module with a processing module, for example, a processor, a controller, an integrated circuit, a Field Programmable Gate Array (FPGA), a single-chip microcomputer, etc.

At 530, the questions with preset formats are counted to generate a questionnaire and/or a data acquisition module. The data acquisition module is configured to display the questionnaire and receive survey information. Step 530 may be completed based on a module with a processing module, for example, a processor, a controller, an integrated circuit, a Field Programmable Gate Array (FPGA), a single-chip microcomputer, etc. The questionnaire may be displayed through a display. The apparatus protected by the method is applicable to any module with the functions of converting, inputting, processing, and displaying, which may be an individual apparatus, such as a mobile phone, a tablet, and a computer, and may also be a system including the apparatus, such as a server, a mobile phone, and a computer. In some embodiments, the method further includes the following operation.

If the data to be converted cannot be converted into target data based on the identification information, then the data to be converted is converted into preset data, and the preset data is a question in the format of a single-choice question and/or a blank-filling question.

In some embodiments, the step that the data to be converted is converted into the preset data further includes the following operations. The present data is identified as a question in a single-choice question format. A question stem of the question in a choice question format is displayed in a first row. Options of the question in the choice question format are displayed in a second row.

In some embodiments, the step that the data to be converted is converted into the preset data further includes the following operations. The preset data is identified as a question in a blank-filling question format. The question stem of the question in the choice question format is displayed in the first row.

In some embodiments, the question included in the data to be converted and the question with a preset format in the target data are displayed. A modification instruction for modifying the target data is received, herein the modification instruction includes information used for modifying the question with the preset format. First data to be converted corresponding to first target data that does not meet a requirement is located based on the modification instruction. The first data to be converted is modified based on the modification instruction.

Embodiments of the specification further provide an apparatus, at least including a processor and a memory. The memory is configured to store an instruction. When the instruction is executed by the processor, the apparatus implements the method for automatically generating a data acquisition module. The method may include the following operations. An input terminal inputs at least one piece of data to be converted, and sends the at least one piece of data to be converted to a conversion terminal, herein each of the at least one piece of data to be converted includes at least one piece of identification information. The conversion terminal identifies the at least one piece of identification information according to the received data to be converted to obtain an identification result. The at least one piece of data to be converted is converted into target data according to the identification result. A data generation end at least generates a data acquisition module based on the target data.

Embodiments of the specification further provide a computer readable storage medium. The storage medium stores computer instructions. A computer executes a method for automatically generating a data acquisition module after reading the computer instructions in the storage medium. The method may include the following operations. An input terminal inputs at least one piece of data to be converted, and sends the at least one piece of data to be converted to a conversion terminal, herein each of the at least one piece of data to be converted includes at least one piece of identification information. The conversion terminal identifies the at least one piece of identification information according to the received data to be converted to obtain an identification result. The at least one piece of data to be converted is converted into target data according to the identification result. A data generation end at least generates a data acquisition module based on the target data.

The embodiments of the application may have, but not limited to, the following beneficial effects. (1) The plurality of pieces of data to be identified may be converted into question information in a questionnaire survey format by identifying identification information in a plurality of pieces of data to be identified and acquiring the question type, the question content, the content included in the question options of each question in the plurality of pieces of data to be converted, which improves the efficiency of entering questionnaire questions and user experience. (2) The identification information that may be identified by the conversion terminal includes a switching identifier and a type identifier, the question types, such as a single-choice question, a multiple-choice question, a blank-filling question, a ranking question, a PK question, a scoring question, and a matrix question, may be identified through a type identifier, which increases the question types that may be entered into the questionnaire, and improves the compatibility of questionnaire questions. (3) The conversion terminal converts the plurality of pieces of data to be converted according to a conversion strategy determined by the identification result. When there is an error character and/or character format in a plurality of pieces of conversion data, the conversion terminal may directly convert the error character and/or character format into a character and/or character format specified in the conversion strategy according to the conversion strategy, which improves the error tolerance rate of entering the questionnaire questions. It is to be noted that different beneficial effects may be achieved in different embodiments. The beneficial effects achievable in different embodiments may be any one or combination of the above, or may be any other achievable beneficial effects.

The basic concepts have been described above. It is apparent to those skilled in the art that the above detailed disclosures are merely examples and not intended to limit the application. Those skilled in the art may make various modifications, improvements, and corrections to the application, even though not specified herein. Such modifications, improvements, and corrections are suggested in the application, and thus still fall within the spirit and scope of the exemplary embodiments of the application.

In addition, specific terms are used in the application to describe the embodiments of the application. For example, "an embodiment", "one embodiment", and/or "some embodiments" mean/means a certain feature, structure, or characteristic related to at least one embodiment of the application. Therefore, it is to be emphasized and noted that "one embodiment", or "an embodiment", or "an alternative embodiment" mentioned twice or for many times at different positions in the specification does not always refer to the same embodiment. In addition, some features, structures, or characteristics in one or more embodiments of the application may be combined as appropriate.

In addition, those skilled in the art can understand that each aspect of the application may be explained and described with a plurality of patentable sorts or conditions, including combinations of any new or useful procedures, machines, products, or substance, or any new and useful improvements thereof. Correspondingly, each aspect of the application may be executed completely by hardware, executed completely by software (including firmware, resident software, microcodes, etc.), or executed by a combination of the hardware and the software. The hardware or software may be called a "data block", "module", "engine", "unit", "component", or "system". In addition, each aspect of the application may be represented as a computer product in one or more computer-readable media, and the product includes a computer-readable program code.

The computer storage medium may include a propagated data signal with a computer program code therein, for example, on a baseband or as a part of a carrier. The propagated signal may be represented in many forms, including an electromagnetic form, an optical form, the like, or a proper combination form. The computer storage medium may be any computer-readable medium except a computer-readable storage medium, and the medium is connected to at least one instruction execution system, apparatus, or device to implement a program for communication, propagation, or transmission. The program code in the computer storage medium may be propagated through any suitable medium, including radio, a cable, an optical fiber, a Radio Frequency (RF), a similar medium, or any combination of the media.

The computer program code required by the operation of each part of the application may be written by any one or more programming languages, including an object-oriented programming language such as Java, Scala, Smalltalk, Eiffel, JADE, Emerald, C++, C#, VB.NET, and Python, a conventional procedural programming language such as C language, Visual Basic, Fortran2003, Perl, COBOL2002, PHP, and ABAP, a dynamic programming language such as Python, Ruby, and Groovy, another programming language, etc. The program code may run completely in a user computer, or run in the user computer as an independent software package, or partially run in the user computer and partially run in a remote computer, or run completely in the remote computer or a server. Under the latter condition, the remote computer may be connected with the user computer through any network form such as a Local Area Network (LAN) or a Wide Area Network (WAN), or connected to an external computer (for example, through the Internet), or in a cloud computing environment, or used as service such as Software as a Service (SaaS).

In addition, unless specified in the claims, the order of the processing elements and sequence, use of numerals and letters, or use of other names in the application is not intended to limit the orders of the flows and methods of the application. Although some invention embodiments that seem useful at present are discussed through various examples in the above disclosure, it should be understood that such details only achieve a purpose of description, and the appended claims are not limited to the disclosed embodiments and intended to cover all corrections and equivalent combinations consistent with the essence and scope of the embodiments of the application instead. For example, the system component described above may be implemented through a hardware device, but may also be implemented only through a software solution. For example, the described system is installed in an existing server or mobile device.

Similarly, it should be noted that, for simplifying the expressions disclosed in the application to help to understand one or more invention embodiments, multiple features may sometimes be incorporated into one embodiment, drawing, or the description thereof in the above description about the embodiments of the application. However, such a disclosure method does not mean that an object of the application needs more features than those mentioned in the claims. In practice, the features of the embodiment are fewer than all features of a single embodiment disclosed above.

Numerals describing the numbers of components and attributes are used in some embodiments. It should be understood that such numerals for describing the embodiments are modified with modifiers "about", "approximately", or "substantially" in some examples. Unless otherwise specified, "about", "approximately", or "substantially" represents that the numeral allows a change of ±20%. Correspondingly, in some embodiments, numerical parameters used in the specification and the claims are all approximate values, and the approximate values may change according to characteristics required by individual embodiments. In some embodiments, the numerical parameter should consider specified valid digits and adopt a general digit retention method. Although numerical ranges and parameters, in some embodiments of the application, used to confirm the breadths of scopes thereof are approximate values, such numerical values are set as accurately as possible in a possible scope in specific embodiments.

The entire contents of each patent, patent application, patent application disclosure, and other materials such as articles, books, specifications, publications, and documents, cited in the application are incorporated in the application by reference, except historical application files inconsistent or conflicting with the contents of the application as well as files (appended to the application at present or latter) limiting the broadest scope of the claims of the application. It is to be noted that the description, definition, and/or use of terms in the application are/is taken as final if the description, definition, and/or use of terms in the materials appended to the application are/is inconsistent or conflict/conflicts with the contents as described in the application.

It should finally be understood that the embodiments in the application are only used to explain the principle of the embodiments of the application, and other transformations may also fall within the scope of the application. Therefore, as an example rather than restriction, alternative configuration of the embodiment of the application may be considered consistent with the teaching of the application. Correspondingly, the embodiments of the application are not limited to the embodiments clearly introduced and described in the application.

What is claimed is:

1. A method for automatically generating a data acquisition module, comprising:

inputting, by an input terminal, at least one piece of data to be converted, and sending the at least one piece of data to be converted to the conversion terminal, wherein each of the at least one piece of data to be converted comprises at least one piece of identification information, the at least one piece of identification information comprises at least one of a switching identifier or a type identifier, the identification information represents certain information of the data to be converted and consists of one or more types of characters, and the characters comprises at least one of numbers, letters, punctuations, texts or other characters;

identifying, by the conversion terminal, the at least one piece of identification information according to the received data to be converted to obtain an identification result, and converting the at least one piece of data to be converted into target data according to the identification result; and generating, by a data generation end, a data acquisition module at least based on the target data, wherein the identifying, by the conversion terminal, the at least one piece of identification information according to the received data to be converted to obtain the identification result comprises:

when the identification information is the type identifier, obtaining the type identifier in the data to be converted through identifying, and identifying a text of the type identifier through a language identification model to obtain the identification result, wherein the identification result is a question type to which the data to be converted belongs; and when the identification information is the switching identifier, obtaining the identification result by identifying a location and a number of the switching identifier, wherein the obtaining the identification result by identifying the location and the number of the switching identifier comprises:

switching between a question with options based on a first switching identifier, and switching between options with options based on a subsequent switching identifier;

wherein the converting the at least one piece of data to be converted into target data according to the identification result comprises:

determining a conversion type of the at least one piece of data to be converted according to the identification result, wherein the conversion type of the data to be converted comprises at least one of a single-choice question, a blank-filling question, a multiple-choice question, a ranking question, a scoring question, or a matrix question;

when the question type of a piece of data to be converted is not identified by the identification result, determining that the conversion type of the data to be converted is a preset type;

extracting a corresponding conversion strategy based on the conversion type; and converting the at least one piece of data to be converted into the target data based on the corresponding conversion strategy and the identification result, wherein the extracting the corresponding conversion strategy based on the conversion type comprises:

extracting a conversion rule corresponding to the question type as the corresponding conversion strategy according to the question type in the identification result, wherein when the question type is the matrix question, the corresponding conversion strategy is that a first row is a matrix question, each matrix question is split and identified by using one or more space characters, and a second row and later subsequent rows are matrix options.

2. The method as claimed in claim 1, wherein the converting the at least one piece of data to be converted into target data according to the identification result comprises:

determining a switching manner according to the identification result; and switching the at least one piece of data to be converted based to the switching manner.

3. The method as claimed in claim 1, wherein the input data to be converted and the converted target data are displayed on an interface of the input terminal at the same time.

4. The method as claimed in claim 3, further comprising:

generating, by the input terminal, a modification instruction according to the target data displayed on the interface;

locating, by the conversion terminal, first data to be converted corresponding to the first target data that does not meet a preset requirement according to the modification instruction; and modifying, by the input terminal, the first data to be converted according to the modification instruction.

5. A system for automatically generating a data acquisition module, comprising:

an input terminal, configured to input at least one piece of data to be converted, and send the at least one piece of data to be converted to the conversion terminal, wherein each of the at least one piece of data to be converted comprises at least one piece of identification information, the at least one piece of identification information comprises at least one of a switching identifier or a type identifier, the identification information represents certain information of the data to be converted and consists of one or more types of characters, and the characters comprises at least one of numbers, letters, punctuations, texts or other characters;

a conversion terminal, configured to identify the at least one piece of identification information according to the received data to be converted to obtain an identification result, and convert the at least one piece of data to be converted into target data according to the identification result; and a data generation end, configured to generate a data acquisition module at least based on the target data, wherein the conversion terminal is further configured to when the identification information is the type identifier, obtain the type identifier in the data to be converted through identifying, and identify a text of the type identifier through a language identification model to obtain the identification result, wherein the identification result is a question type to which the data to be converted belongs; and when the identification information is the switching identifier, obtain the identification result by identifying a location and a number of the switching identifier, wherein the conversion terminal is further configured to switch between a question with options based on a first switching identifier, and switch between options with options based on a subsequent switching identifier;

wherein the conversion terminal is further configured to determine a conversion type of the at least one piece of data to be converted according to the identification result, wherein the conversion type of the data to be converted comprises at least one of a single-choice question, a blank-filling question, a multiple-choice question, a ranking question, a scoring question, or a matrix question; when the question type of a piece of data to be converted is not identified by the identification result, it is determined that the conversion type of the data to be converted is a preset type; extract a corresponding conversion strategy based on the conversion type; and convert the at least one piece of data to be converted into the target data based on the corresponding conversion strategy and the identification result, wherein the conversion terminal is further configured to extract a conversion rule corresponding to the question type as the corresponding conversion strategy according to the question type in the identification result, wherein when the question type is the matrix question, the corresponding conversion strategy is that a first row is a matrix question, each matrix question is split and identified by using one or more space characters, and a second row and later subsequent rows are matrix options.

6. The system as claimed in claim 5, wherein the conversion terminal is configured to:

determine a switching manner according to the identification result; and switch the at least one piece of data to be converted based to the switching manner.

7. The system as claimed in claim 5, wherein the input terminal is configured to:

display the input data to be converted and the converted target data on an interface of the input terminal at the same time.

8. The system as claimed in claim 7, further comprising:

the input terminal, configured to acquire a modification instruction;

the conversion terminal, configured to locate the first data to be converted corresponding to the first target data that does not meet the preset requirement according to the modification instruction; and the input terminal, configured to modify the first data to be converted according to the modification instruction.

* * * * *